(12) United States Patent
Chalhoub et al.

(10) Patent No.: US 9,733,696 B2
(45) Date of Patent: *Aug. 15, 2017

(54) DYNAMIC LOW POWER STATES CHARACTERIZATION

(71) Applicant: TEXAS INSTRUMENTS INCORPORATED, Dallas, TX (US)

(72) Inventors: Nicole Chalhoub, Antibes (FR);
Damien Ramonda, Mougins (FR);
Francois Lacoste, Roquefort les Pins (FR); Karine Bartolo, Le Rouret (FR);
Vincent Bour, Antibes (FR)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/018,733

(22) Filed: Feb. 8, 2016

(65) Prior Publication Data

US 2016/0154456 A1 Jun. 2, 2016

Related U.S. Application Data

(63) Continuation of application No. 14/135,577, filed on Dec. 20, 2013, now Pat. No. 9,256,274.

(30) Foreign Application Priority Data

Aug. 1, 2013 (EP) ..................................... 13290183

(51) Int. Cl.
*G06F 1/26* (2006.01)
*G06F 1/32* (2006.01)

(52) U.S. Cl.
CPC .......... *G06F 1/3296* (2013.01); *G06F 1/3206* (2013.01); *G06F 1/3228* (2013.01); *G06F 1/3234* (2013.01)

(58) Field of Classification Search
CPC ..................................................... G06F 1/3234
USPC ................................................ 713/300, 320
See application file for complete search history.

(56) References Cited

U.S. PATENT DOCUMENTS

| | | | |
|---|---|---|---|
| 7,327,754 B2 | 2/2008 | Mills et al. | |
| 9,256,274 B2 * | 2/2016 | Chalhoub | G06F 1/3234 |
| 2013/0111242 A1 | 5/2013 | Heller et al. | |
| 2014/0189398 A1 | 7/2014 | Gorbatov | |
| 2015/0026495 A1 | 1/2015 | Jain | |

* cited by examiner

*Primary Examiner* — Mark Connolly
(74) *Attorney, Agent, or Firm* — Ronald O. Neerings; Charles A. Brill; Frank D. Cimino

(57) ABSTRACT

An optimal idle state of a processor is selected using dynamically derived parameters. For example, the idle state is selected from a group of possible idle power states. A current detector is arranged to perform power measurements of the processor and to report a total power consumption of the processor for each time value of a range of discrete values for each possible idle power state. A calibration unit is arranged to communicate with the current detector and the processor, and to automatically activate a calibration sequence that is used to produce data from which idle power state is optimal for the processor for an estimated idle period.

20 Claims, 4 Drawing Sheets

DYNAMIC LOW POWER STATES CHARACTERIZATION

CLAIM OF PRIORITY

This application for Patent is a Continuation of application Ser. No. 14/135,577 filed Dec. 20, 2013, which claims priority to EP PS Application No. 13290183.6 entitled "DYNAMIC LOW POWER STATES CHARACTERIZATION" filed Aug. 1, 2013 in the French Patent Office, wherein the application listed above is incorporated by reference herein.

BACKGROUND

Increased integration of digital processors has led to processor architectures that provide increased functionality and processing capabilities. The increased integration and increased functionality also leads to greater power consumption and/or power dissipation. Excessive power consumption and power dissipation often limit the functionality and battery-life of portable devices that incorporate processors. For example, the time duration of portable devices operating in an active mode is limited by the ability of portable power supplies (which can be expensive, bulky, and heavy) to meet the power consumption demands of the portable devices. Likewise, minimizing heat build-up and energy consumption are of concern even in many devices that are coupled to line power.

SUMMARY

As disclosed herein, the problems noted above can be solved in large part by informed selection of low power states of a device that are used to save power. For example, the power consumption of a device in various low power states can be dynamically characterized and the characterization used to select a low power state that is optimal with respect to the expected length of a quiescent period of the device.

A system for dynamic low-power characterization for power state selection typically includes a processor coupled to a power supply, a detector, and a calibration unit. The operation of the processor includes idle power states, where each idle power state is associated with an idle period. The detector is arranged to perform power consumption measurements of the processor and to report a total power consumption of the processor for each possible idle power state. The calibration unit is arranged to communicate with the detector and the processor, and to receive total power consumption-related data from the detector. The calibration unit automatically activates a calibration sequence to store threshold information that is used to select an optimal low power state of the processor.

The threshold information is determined by repeating the calibration sequence for different idle periods and for each low power state, comparing the received total power consumption data for each low power state for the different idle periods with total power consumption data for each of the other low power states for the different idle periods, and selecting an optimal low power state for a given idle period based on the total power consumption data reported by the detector. In some example embodiments, the detector may be arranged in a substrate in which the processor is arranged.

This Summary is submitted with the understanding that it is not be used to interpret or limit the scope or meaning of the claims. Further, the Summary is not intended to identify key features or essential features of the claimed subject matter, nor is it intended to be used as an aid in determining the scope of the claimed subject matter.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be example of that embodiment, and not intended to intimate that the scope of the disclosure, including the claims, is limited to that embodiment.

Certain terms are used throughout the following description—and claims—to refer to particular system components. As one skilled in the art will appreciate, various names may be used to refer to a component or system. Accordingly, distinctions are not necessarily made herein between components that differ in name but not function. Further, a system can be a sub-system of yet another system. In the following discussion and in the claims, the terms "including" and "comprising" are used in an open-ended fashion, and thus are to be interpreted to mean "including, but not limited to . . . ." Also, the terms "coupled to" or "couples with" (and the like) are intended to describe either an indirect or direct electrical connection. Thus, if a first device couples to a second device, that connection can be made through a direct electrical connection, or through an indirect electrical connection via other devices and connections.

Figure 1:
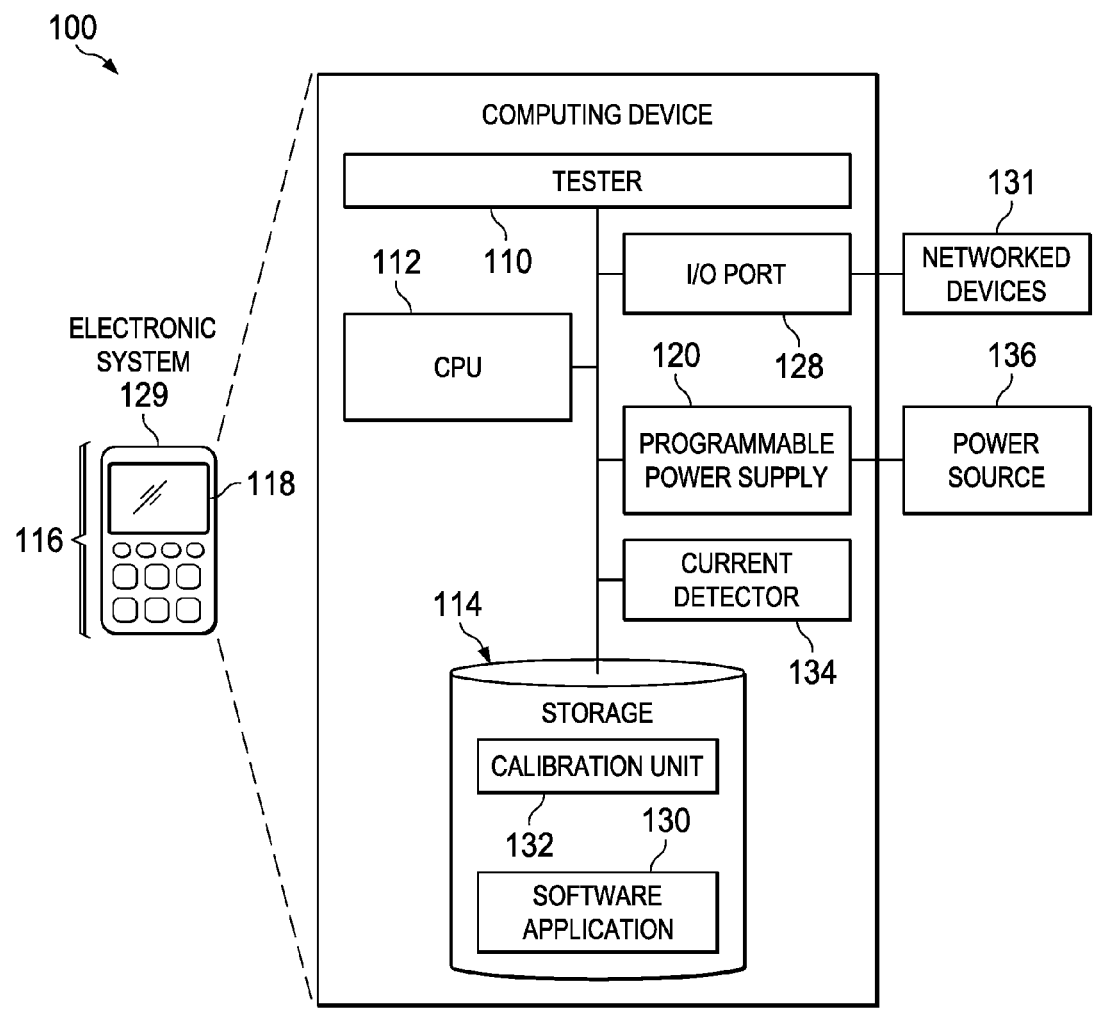
FIG. 1 is a block diagram illustrating a computing device 100 in accordance with preferred embodiments of the disclosure.

FIG. 1 is a block diagram illustrating a computing device 100 in accordance with preferred embodiments of the disclosure. For example, the computing device 100 is, or is incorporated into, a mobile communication device 129, such as a mobile phone, a personal digital assistant, a personal computer, automotive electronics, projection (and/or media-playback) unit, or any other type of electronic system.

In some embodiments, the computing device 100 includes a megacell or a system-on-chip (SoC). Computing device 100 may include control logic such as a CPU 112 (Central Processing Unit), a storage 114 (e.g., random access memory (RAM)) and tester 110. Computing device 100 also includes a detector 134 (e.g., a current sensor) that is arranged to measure power consumption of CPU 112 over time.

The CPU 112 can be, for example, a CISC-type (Complex Instruction Set Computer) CPU, RISC-type CPU (Reduced Instruction Set Computer), or a digital signal processor (DSP). For example, the CPU 112 can be a processor such as a microcontroller that is arranged in a common substrate with the storage 114, tester 110, and the detector 134.

The storage 114 (which can be memory such as on-processor cache, off-processor cache, RAM, flash memory, or disk storage) stores one or more software applications 130 (e.g., embedded applications) that, when executed by the CPU 112, perform any suitable function associated with the computing device 100. For example, calibration unit 132 can be implemented using program and data information stored in storage 114 that is processed by CPU 112.

The tester 110 is a diagnostic system and comprises logic (embodied at least partially in hardware) that supports monitoring, testing, and debugging of the computing device 100 executing the software application 130. For example, the tester 110 can be used to emulate one or more defective or unavailable components of the computing device 100 to allow verification of how the component(s), were it actually present on the computing device 100, would perform in various situations (e.g., how the components would interact with the software application 130). In this way, the software application 130 can be debugged in an environment which resembles post-production operation (e.g., that occurs after deployment).

The CPU 112 comprises memory and logic that processes and/or (at least temporarily) stores information under control of programs accessed from the storage 114. The computing device 100 is often controlled by a user using a UI (user interface) 116, which provides output to and receives input from the user during the execution the software application 130. The output is provided using the display 118, indicator lights, a speaker, vibrations, and the like. The input is received using audio and/or video inputs (using, for example, voice or image recognition), and electro-mechanical devices such as keypads, switches, proximity detectors, and the like.

The CPU 112 and tester 110 are coupled to I/O (Input-Output) port 128, which provides an interface that is configured to receive input from (and/or provide output to) peripherals and/or computing devices 131, including tangible (e.g., "non-transitory") media (such as flash memory) and/or cabled or wireless media (such as a Joint Test Action Group (JTAG) interface). These and other input and output devices are selectively coupled to the computing device 100 by external devices using wireless or cabled connections. The CPU 112, storage 114, and tester 110 are also coupled to a programmable power supply 120, which is configured to receive power from a power source 136 (such as a battery, solar cell, "live" power cord, inductive field, fuel cell, and the like).

As disclosed herein, a detector 134 is used to measure the power consumption of the SoC that includes the CPU 112. Detector 134 is coupled to the SoC and arranged to measure total power consumption of the SoC for each given low power state of the processor. A low-power state is, for example, any power state during which power conservation is desired while operating a subset of components of the SoC. Detector 134 can be a current sensor (such as a resistor) or an electromagnetic field sensor (such as an inductor) that is arranged to develop a voltage that corresponds to the current being measured. In response, the detector is arranged to provide indications of power consumption of the processor that are used to determine an amount of power consumed by the processor while in any C-state. To measure the total power consumption of the SoC, detector 134 may be configured to convert the developed voltage into a (e.g., digital) value that corresponds to the instantaneous current measured. The power consumption can be determined from the current measurements in accordance with the applied voltage, for example.

An application processor, such as a multimedia processor, is often the most power-consuming device in portable electronic appliances. During times of lesser or no activity, the processor may be programmed to enter low power states (such as an idle state) in order to save energy. Each processor typically has different levels of idle power states, such as an inactive mode, a retention mode, and an off mode. The different levels of power states are collectively called "C-states." During idle power states power is selectively decoupled from idle units inside the processor. Usually, greater energy savings are achieved when greater numbers of components of the processor are halted.

A deep idle power state corresponds with very low power consumption. As illustrated below with reference to FIG. 3a and FIG. 3b, a deep low power state typically requires more energy and longer transition periods for the processor to enter the idle power state and to emerge from the idle power state. Hence, an idle time can be predicted (e.g., based on processing requirements over a quiescent period), and an optimal power state can be selected based on various trade-offs between entry/exit sequences energy cost and idle power gain during the predicted idle period.

Conventionally, the different levels of power states (C-states) of a processor are determined through simulation and static calibration in an engineering laboratory. The optimal idle power states for a specific processor are found through laboratory-based characterization at a given time (e.g., after manufacture and before deployment) and in a predetermined environment (e.g., room temperature). The C-state ranking is maintained throughout the life of the processor, even if some of the selected idle power states are no longer optimal as the processor ages over its operational lifetime.

As disclosed herein, a dynamic low power state calibration unit is arranged to dynamically measure actual current consumption during each low power state at various points in the lifetime of the computing device 100. The actual current consumption (e.g., after deployment at any point in the lifetime) can be measured using embedded and automated process, and the current measurements can be used to refine and tune power parameters that are associated with each C-state. Accordingly, power consumption for various C-states can be optimized at the product level for each device after deployment.

Software applications 130 can be used to implement (or be coupled to) a calibration unit 132. Calibration unit 132 is arranged to automatically trigger a calibration sequence to select the most optimal idle power state for CPU 112 that can be reached within a given idle time.

Calibration unit 132 is arranged to collect, store, analyze, process, organize, and distribute data received from detector 134. In particular, calibration unit 132 performs a calibration sequence by varying idle periods of CPU 112, storing power consumption data received from detector 134 for each idle period, comparing the stored data with a list of idle power states, and determining an optimal idle power state for CPU 112 for various ranges of idle periods based on the total power consumption reported by detector 134 for specific idle power state durations. Calibration unit 132 can be arranged in a common (or separate) substrate to form an integrated unit with the processor and/or the detector. In other example embodiments, detector 134 and calibration unit 132 can be arranged in assemblies separate from the computing device. The detector 134 can be arranged in a common substrate, for example, that includes a processor that is arranged to perform analog-to-digital conversions.

Figure 2:
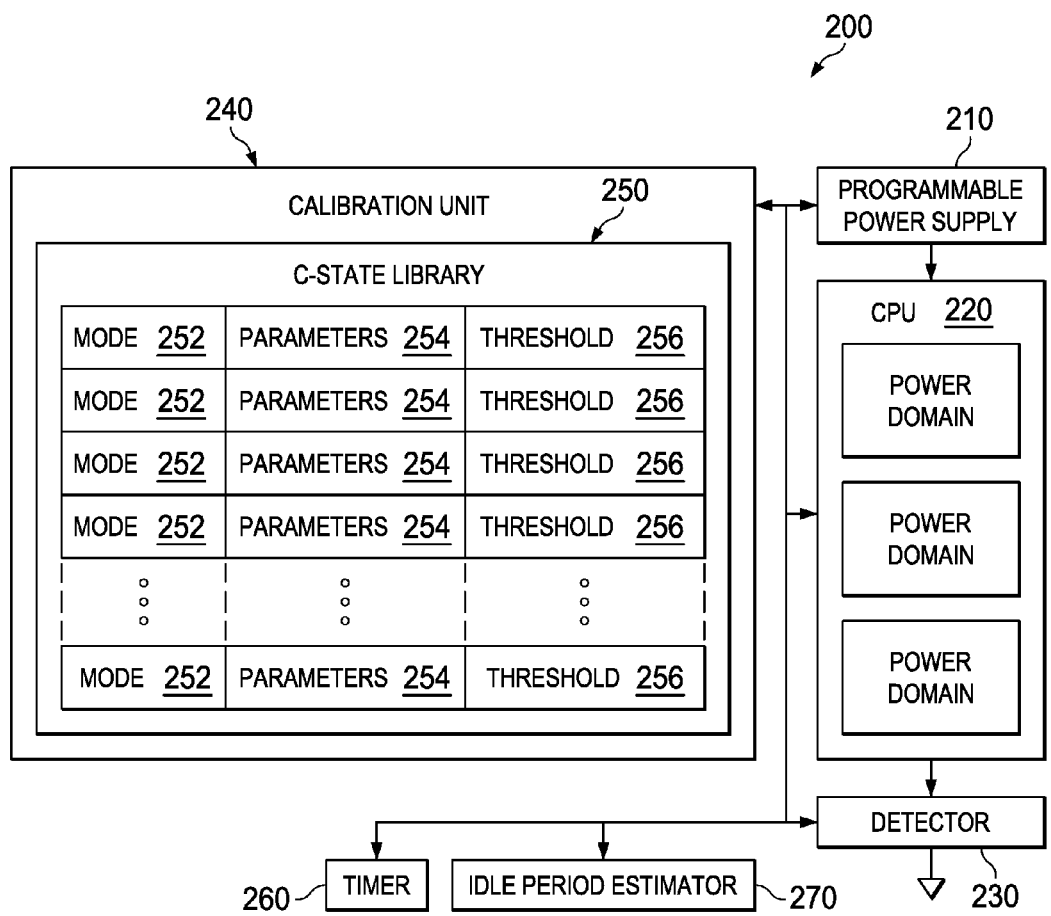
FIG. 2 is a block diagram illustrating a system having dynamic low-power characterization for power state selection in accordance with an example embodiment of the disclosure.

FIG. 2 is a block diagram illustrating a system 200 having dynamic low-power characterization for power state selection in accordance with an example embodiment of the disclosure. System 200 includes a programmable power supply 210 that is arranged to supply power to CPU 220 (which is a processor such as CPU 112). CPU 220 includes power domains (e.g., power domains 222, 224, and 226) each of which is used for powering a selectable component of the CPU 220. The power domains are individually selected to provide (or, alternately, deselected to conserve) power associated with a processing unit. The power consumed by the processor 220 can be measured using the detector 230.

The calibration unit 240 is arranged to measure current consumption in various low power states and store the results in C-state library 250. For example, the calibration unit is arranged to individual measure a power consumption of the CPU in each low power state (e.g., for use in selecting an appropriate low power state during actual operation) The programmable power supply 210 and/or the CPU 220 are selectively enabled in accordance with each low power state that is to be characterized.

Each low power state 252 is characterized by measuring power-related parameters 254 (including, for example, the power used while entering, remaining in, and exiting a selected power state). The length of time over which the CPU 220 changes power states can be measured using timer 260. Likewise, the timer 260 can be used to control the length of time the CPU remains in the idle period of a selected power state. A threshold 256 is a duration that indicates a power state transition threshold that indicates an optimal power state that is used in accordance with the duration of an estimated idle period. (As discussed below, various power states have varying efficiencies that depend on, for example, the length of time of the estimated idle period.)

In operation, the idle period estimator 270 is arranged to determine the duration of a period of quiescence (e.g., limited processing) in response to an operating state and/or conditions of the system 200. When the idle period is estimated, the estimated idle period value is compared with the threshold 256 values (e.g., to determine whether the estimated idle period value falls within a particular range defined by the thresholds 256 values), and an optimal power operating state is selected in accordance with the comparison.

During idle periods that occur during normal operation (such as when the CPU is being used for an intended purpose that is different from the characterization process), the processor is selectively be programmed to enter lower power states (e.g., in order to save energy from being expended). In general, processors have several power saving states called C-states, which reflect the capability of an idle processor to turn off unused components (e.g., units, sub-processors, clock trees, power supplies, and the like) in order to save power.

The C-states are typically indicated with a number, for example C1, C2, C3 . . . Cn. The various C-states can be entered by gating clock signals (e.g., to prevent clock transitions), by cutting power from idle units inside the CPU 220, by reducing the CPU voltage supplied by the programmable power supply, and the like. In the state where a processor runs in the C0 state, the processor is considered to be actively executing instructions. A processor running in any other C-state has components that are idle and thus do not consume as much power as when the CPU 220 is actively executing instructions. The state C1 typically refers to a power saving state wherein the internal CPU clock signal is stopped.

The higher the C number, the deeper the CPU sleep state (e.g., higher C numbers are used to describe situations where more components are shut down to save power). While the deeper sleep states increasingly save more power, greater latencies (e.g., transition times encountered while changing power states) are progressively encountered. In various example embodiments, a state can also have sub-states with different power saving thresholds. Thus, the degree of depth of the low power state can be progressively chosen to minimize latencies and power consumption.

Generally, each C-state has three periods associated with an idle period. For example, the entry transition period (e.g., save period) is the period used for the processor to transition from an active to an inactive state. The quiescent idle time is the period between the end of the entry transition period and the beginning of the exit transition period. The exit transition period (e.g., restore period) is the period that is used by the processor to transition from a wake-up event to the active state.

Figure 3A:
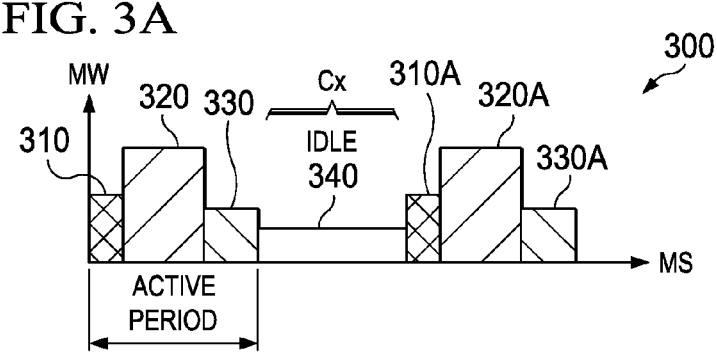
FIGS. 3a and 3b are graph diagrams that illustrate the total amount of power consumed by a processor over time in accordance with an example embodiment of the disclosure.
Figure 3B:
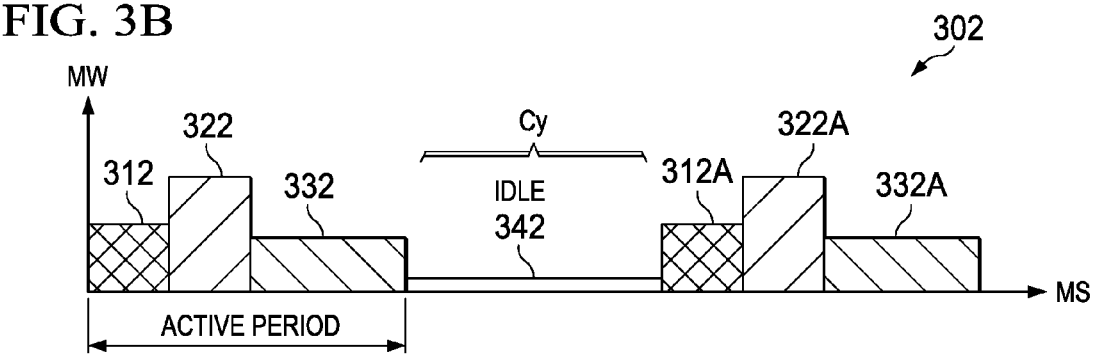

FIGS. 3a and 3b are diagrams that illustrate the total amount of power consumed by a processor over time in accordance with an example embodiment of the disclosure. Graphs 300 and 302 show time (in units of milliseconds) on the x-axis and power (in units of mW) on the y-axis.

FIG. 3a includes a graph 300 for illustrating a predefined idle power state 340 (Cx). Graph 300 includes blocks 310, 320, 330, and 340, each of which reflects the amount of power consumed by the processor over a defined period of time. Block 310 represent the amount of energy used to transition to an active operating state. Block 320 represents the amount of energy used by a processor during the active operating state of the processor (e.g., when the processor is fully turned on). Block 330 represents the amount of power consumed during a transition state wherein the processor transitions from the active operating state to low power state Cx. Block 340 represents a low power state wherein the processor is in the idle state Cx. Thus, block 310A represents the amount of energy that is needed to wake up the processor from low power state Cx, after which the processor reenters the operating state represented by block 320A. A further low power state can be entered as suggested by block 330A. Thus, the sequence of activity/inactivity can be repeated over time.

FIG. 3b shows a diagram 302 of another idle power state Cy of the processor illustrated in FIG. 3a. Graph 302 includes blocks 312, 322, 332, and 342, each of which reflects the amount of power consumed by the processor over a defined period of time. Block 312 represent the amount of energy used to transition to an active operating state. Block 322 represents the amount of energy used by a processor during the active operating state of the processor (e.g., when the processor is fully turned on). Block 332 represents the amount of power consumed during a transition state wherein the processor transitions from the active operating state to low power state Cx. Block 342 represents a low power state wherein the processor is in the idle state Cx. Thus, block 312A represents the amount of energy that is needed to wake up the processor from low power state Cx, after which the processor reenters the operating state represented by block 322A. A further low power state can be entered as suggested by block 332A.

Idle power state Cy is deeper than idle power state Cx, which is reflected by the lower power consumption encountered by the processor during the more prolonged idle time of power state Cy. However, longer idle periods are needed to justify optimally transitioning into power state Cy (as compared with merely transitioning into power state Cx) because transition times are longer, as shown by blocks 310 and 330. Thus, matching the selected power state to the expected length of the idle time allows transitioning to the selected low power state using a minimum of power consumption overall.

Accordingly, a deeper idle power state is associated with longer transition periods, which entail higher energy costs while transitioning into and out of the idle time periods. Depending on the predicted idle time, the most optimal idle power state is selected based on a trade-off between the entry and exit sequences energy cost and the idle power saved during the quiescent idle period.

Selecting the most optimal idle power state from amongst different possible idle power states for a given idle time depends on the accuracy of the trade-off analysis. The trade-off analysis typically depends of different parameters, such as the SoC type, temperature, product type, and/or the type of application running on the device. Because of product aging (which, for example, produces gradual changes in junction characteristics over the lifetime of the system 200) and different performance levels at differing operating temperatures, voltages, and software applications, a calibration sequence is performed using (e.g., as closely as possible) normal operating conditions (such as a during, or in-between, active processing).

As disclosed herein, the calibration unit performs a calibration sequence to select the most optimal idle power states for the device that can be selected for a given (e.g., estimated) idle time. The calibration sequence determines characteristics for all the available idle power states that are used to determine which power state is the most efficient (e.g., based on total power consumption) for a given idle time. The calibration process can be initiated in the field when during boot, sleep, hibernate, shutdown modes, at periodic times, upon request, and the like. In some embodiments, the calibration unit engages an embedded current sensor (e.g., that is able to automatically perform the power measurements during any change in power state) and store the results in library 250. The calibration sequence can also be triggered in the field each time a predetermined parameter changes. The parameters changes can be a change such as a change in temperature or a change in performance requirements of the application. For example the performance requirements can be specified using units of operational performance points (OPPs) which, for example, indicate an amount of work being accomplished by a processor over a given time period.

Figure 4:
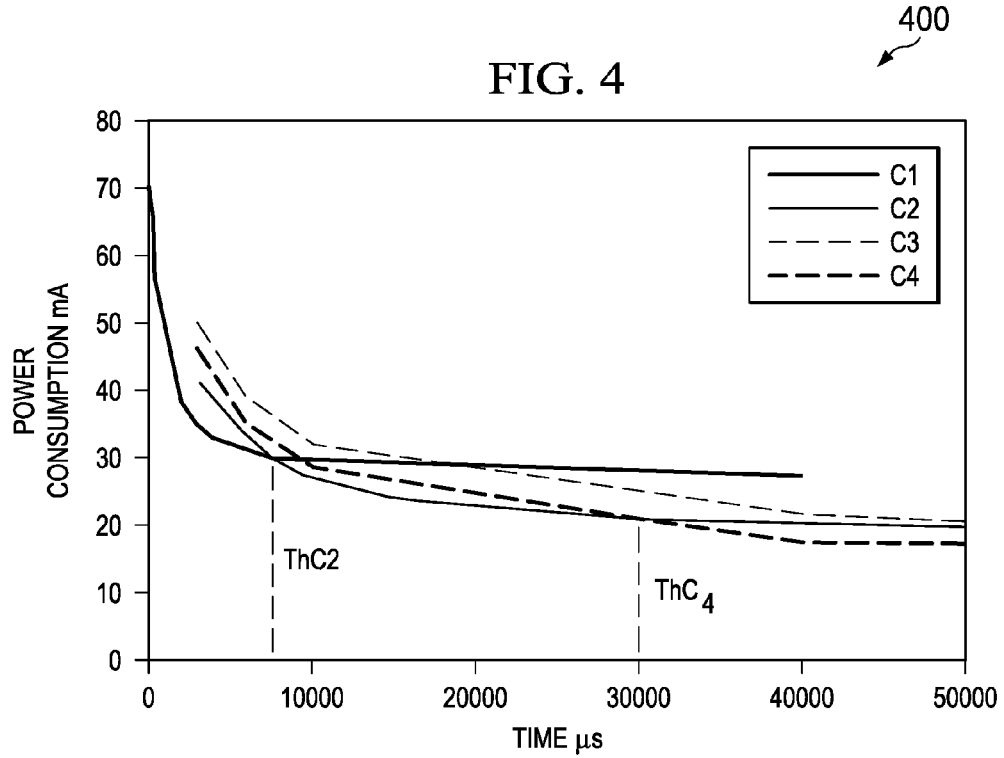
FIG. 4 is a graph that illustrates variations in total power consumption for various lengths of the different idle power states of a processor in accordance with an example embodiment of the disclosure.

FIG. 4 is a graph that illustrates variations in total power consumption for various lengths of the different idle power states of a processor in accordance with an example embodiment of the disclosure. The graph 400 illustrates four curves that represent power consumption profiles (e.g., curves) of four different low power states of a processor, namely C1, C2, C3, and C4. Thus, for example, each point on a curve represents the total power consumed during an idle state when the duration of the idle period is (only) the length of the time value shown on the horizontal axis.

The graph also illustrates threshold times, ThC2 and ThC4, which respectively correspond to thresholds associated with transitioning to low power states C2 and C4. Each intersection between an initial C-state profile and a successive C-state profile determines a threshold time that corresponds to a point at which there is a change in optimal C-state of the processor. Because the optimal state is defined as the lowest power consumption, the lowest portions of the power profiles define the optimal power states. Thus, the threshold time defines a length of an estimated idle time after which the named successive C-state is most optimal.

For example, the threshold ThC2 is a time value (e.g., that corresponds with an idle time of about 7,500 µs) at which time the curves C1 and C2 intersect. For idle times shorter than ThC2, C1 is determined as the most optimal C-state. For idle times longer than ThC2, C2 is determined as the most optimal C-state. Between about 7,500 µs and about 30,000 µs, C2 is determined as the most optimal C-state for the processor. At about 30,000 µs, curves C2 and C4 intersect (at the threshold ThC4) and the threshold ThC4 indicates the idle time value at which there is a change in optimal C-state. Thus C-state C4 is defined as the most optimal C-state for idle time longer than around about 30,000 µs.

Each time a calibration sequence is triggered (e.g., during normal system operation), the embedded current sensor is arranged to provide a power consumption profile over each possible idle power state defined for the processor. The embedded current sensor can measure the instantaneous current at intervals sufficient to provide sufficient resolution of power profiles to provide a substantial power savings when using the disclosed dynamic characterization. A substantial power savings is, for example, a power savings that is measurable.

During a calibration sequence, a software application (using timer 260, for example) can be used to vary the wakeup period of the central processing unit, which determines the end of the idle period. (For example, a timer can be programmed using an adjustable terminal value to set the length of idle period.) At the end of the idle period, the power consumed (as measured over the length of the idle period) is aggregated and used to plot a point on the curve. (Linear interpolation can be used to approximate points for which no current measurements are made.)

A curve that illustrates the total power consumption of the processor for different idle periods is generated for each possible idle power state. Superimposing and analyzing the generated curves for each idle power state allows for determining the most optimal idle power state for a given range of idle periods. Accordingly, the calibration system does not require the use of an engineering laboratory for individual characterization of the different idle power states. Instead, the selection and the ranking of the different idle power states are processed automatically by a dynamic process in the calibration unit. In some embodiments, the system may reduce the number of low power states that are characterized by characterizing only the most optimal idle power states (e.g., by performing the characterization on only the idle states having the lowest curve segment in between threshold times of FIG. 4), which reduces the time and power required for power state characterization.

Figure 5:
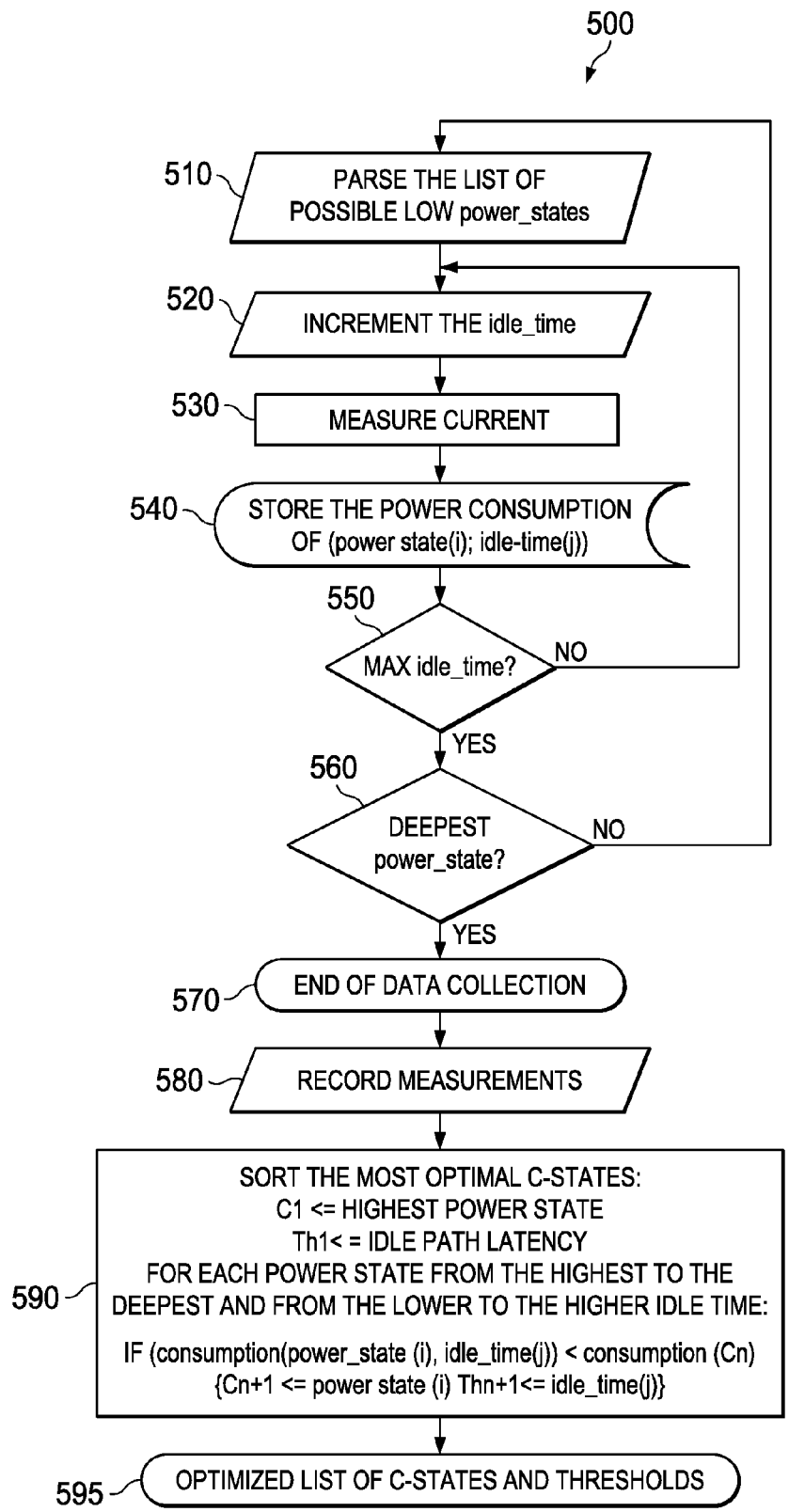
FIG. 5 is a flow diagram illustrating dynamic low-power characterization for power state selection in accordance with an example embodiment of the disclosure.

FIG. 5 is a high-level flow diagram illustrating dynamic low-power characterization for power state selection in accordance with an example embodiment of the disclosure. A calibration sequence 500 performed by a calibration unit (such as calibration unit 240) can be implemented in hardware and/or in various combination of software and hardware. Calibration sequence 500 includes a data collection process performed in operations 510 to 570, storage of recorded measurements in operation 580, and a sorting process arranged to select the most optimal C-states in operation 595 and to provide an updated optimized list of C-states in operation 595.

The calibration sequence is initiated at operation 510 wherein a list of data of possible low power states (C-states) for the processor is parsed. The parsed information includes, for example, information sufficient to identify each particular low power state to be characterized and to induce the processor to enter an identified particular power state each occasion process 510 is entered. Each particular low power state that is characterized is added to a group of the characterized idle states. The process proceeds to operation 520.

In operation 520, the calibration sequence is provided with a value that is used to increment the duration of an idle time to be used for characterizing an idle state. For example, the idle time can be set to increase in increments of 100 µs such that each successive iteration of operation 530 has a duration that is 100 µs longer than the previous iteration. The increment is set finely enough to provide accurate power profiles while not incurring excessive processing requirements (such as OPPs and power) during characterization. Program flow continues in operation 530.

In operation 530, the total current of the process measured (by the current detector) in response to the expiration of the elapsed idle time. The total current (which can be used to determine the total power, and vice versa) can be determined by aggregating current measurements performed throughout the idle period. The measurement of the total currents includes the transition time to enter and exit the idle period as well as the power consumed in the idle period itself. Thus, each characterized idle state is characterized by determining an aggregate amount of power consumed by the processor during each iteration (e.g., when the processor is operating in the idle state being characterized for different idle periods). In some example embodiments, the total current can include measurements that occur during one or more of the entry transition period, the quiescent idle period, and the exit transition period. Program flow continues in operation 540.

In operation 540, data sets reflecting the current measurements are stored. In particular, for a given idle power state (C-state) and a given idle time (incremented), the aggregate current measurements provide an indication of the total power consumption of the processor (e.g., over the period of time over which the samples are aggregated), and the power consumption data are stored. Program flow continues in operation 550.

In operation 550, idle times are compared to a maximum idle time to determine whether all data points have been produced for the identified particular power state. If a maximum idle time has not yet been reached, the sequence returns to operation 520 where the idle time is incrementally increased (and another data point is produced). The sequence proceeds with the new idle time through operations 530, 540 and 550. The operational process is repeated until the maximum idle time is reached. When the maximum idle time is reached, program flow continues in operation 560.

In operation 560, the sequence verifies whether the last (e.g., deepest) power state has been reached. For example, if the sequence has performed operations 520 to 560 with a high power state (such as C2 state), the sequence returns to operation 510 and repeats operations 520 to 560 by characterizing a deeper power state (for example C3). The sequence repeats until the last power state has been characterized, and program flow continues in operation 570.

In node 570, the data collection portion of the calibration sequence has ended. Program flow continues in operation 580. wherein each characterized idle state is characterized by determining an aggregate amount of power consumed by the processor of each iteration when the processor is operating in the idle state being characterized for different idle period In operation 580, data retrieved from the data collection process are recorded for post-measurement analysis. Program flow continues in operation 590.

In operation 590, C-states are sorted based on an algorithm that finds optimal C-states and associate threshold times. The algorithm begins with selecting C1 as the highest power state and determining a threshold Th1 that is a value that is around the minimum idle path latency. The algorithm compares relative power consumption (Cn) of each power profile at each idle time point. The comparison can proceed from the highest to the deepest power state and from the shorter to the longer idle times. Thus, the comparison identifies the power profile (e.g., power state) having the lowest power consumption at each value of idle times. The optimal idle power state and threshold times are verified and sorted to determine the power state transition thresholds (such as ThC2 and ThC4 as discussed above with respect to FIG. 4.)

The process is repeated (e.g., in operation 590) until all a C-states are sorted with corresponding updated threshold times (which reflect changes of one optimal C-state to another optimal C-state). Thus an optimal idle state can be selected in response to the characterized idle states by (for example) using an estimated idle period (in which the processor is estimated to remain in the selected idle state) as an index for comparing with the thresholds and determining the particular C-state that is associated with the threshold have the same (or closest lower) value as the estimated idle period.

Program flow terminates in operation 595 by providing an optimized list (e.g., C-state library 250) of C-states and corresponding threshold times (such as thresholds 256). As discussed above, the provided list is used to select a power state that is optimal for time in which a processor (or component thereof) is expected to be quiescent.

By automatically performing a calibration sequence (e.g., during normal operation after deployment), the system can compensate for progressively occurring changes in idle power states, for example due to changes in process performance, device aging, or changes in process distribution, without soliciting user input. In some example embodiments, the calibration unit may repeat the calibration sequence periodically. In other example embodiments, a list of selected idle power states and their associated idle periods in the calibration unit may be updated based on a change in one or more predetermined parameters. For example, predetermined parameters that trigger the calibration sequence in the field may include a product type in which the computing device is used (for example a mobile phone, a personal digital assistant, a personal computer, automotive electronics, or a projection (and/or media-playback) unit), a type of computing device (for example a system-on-chip, such as multimedia application processor), a particular application running on the computing device, a substantial temperature change of the computing device (e.g., a temperature change that would result in the power state transition thresholds) and/or by performance requirements of the computing device (for example, a change in an operating performance point).

The disclosed calibration system optimizes power consumption of a device. For example, in some multimedia use cases implementation of the calibration system can result in power savings of up to 30 percent. Additionally, the actual power consumption of a computing device or processor may vary in accordance with a particular customer implementation. Implementation of the disclosed calibration systems, devices, and methods may be adjusted to specific customer products by providing (e.g., after deployment of the specific product) a parsable list of possible idle power states for the specific product. In some embodiments the list may be modified, in other embodiments the list may be repeated, either partially or entirely. The parsable list of possible ide power states need not provide a ranking of the different idle power states. In some embodiments, the calibration system may take advantage of already-implemented debug structures used for power optimization, for example as present in tester 110.

Although the system is described in terms of using a processor, the dynamic calibration unit also can function with or without the use of processor logic. The dynamic calibration unit can be implemented in hardware and/or in various combinations of software and hardware. In some example embodiments, the current detector may be arranged in a substrate that includes the computing device. In other example embodiments, the current detector may be arranged in a different substrate. In further example embodiments, the current detector may be a component that is distinct from the computing device.

In some example embodiments, a current detector may be integrated in a power-management device. In further example embodiments, a dynamic calibration unit may be included in the current detector (for example a current detector may include an internal storage facility and software to execute the functions of the calibration unit). In further example embodiments, a current detector may store data and the functions of the calibration unit may be executed on a different device that is coupled to the processor for which optimal power states are selected.

The disclosure further contemplates methods for characterizing low power states. In some embodiments, the method may include coupling a processor to a power supply, the processor including a plurality of idle power states, and with each idle power state associated with an idle period. A current detector may be coupled to the processor. The detector may be arranged to perform total power consumption measurements of the processor. A calibration unit may be coupled to the detector and the processor, and the calibration unit may be arranged to automatically activate a calibration sequence to select an optimal idle power state of the processor based on receiving total power consumption data from the detector for each idle period, comparing the received total power consumption data with stored total power consumption data for each idle power state, repeating the process for different idle periods, and selecting an optimal idle power state for a given idle period. In some embodiments, the calibration sequence is activated by one or more predetermined parameters. In further embodiments, the calibration unit includes a list of selected idle power states and their associated idle periods, and the list is updated automatically. In some embodiments, the calibration unit determines a threshold time associated with changes in optimal idle power states and the threshold time is updated automatically.

The various embodiments described above are provided by way of illustration only and should not be construed to limit the claims attached hereto. Those skilled in the art will readily recognize various modifications and changes that could be made without following the example embodiments and ad applications illustrated and described herein, and without departing from the true spirit and scope of the following claims.

What is claimed is:

1. A computing device, comprising:
a processor that is arranged to enter an idle state that is selected from a group of characterized idle states, wherein the selected idle state is selected from the group of the characterized idle states in response to an estimated idle period in which the processor is estimated to remain in the selected idle state;
a detector that is arranged to provide processor power indications that are used to determine an amount of power consumed by the processor while the processor is in any of the idle states of the group of characterized idle states; and
a calibration unit that is arranged to characterize each idle state of the group of characterized idle states in response to the provided processor power indications, wherein each idle state is characterized by determining an aggregate amount of power consumed by the processor during each iteration of the processor operating in the idle state for a different idle period.

2. The device of claim 1, wherein the calibration unit is arranged to compare an aggregate power consumption for each different idle period of a plurality of characterized idle states of the group of idle states and select an idle state having the least aggregate amount of power that is associated with the estimated idle period.

3. The device of claim 2, wherein the calibration unit is arranged to compare each aggregate power consumption for each different idle period of a first characterized idle state with each aggregate power consumption for each respective different idle period of a second characterized idle state and determine a threshold where one of the aggregate power consumption for each different idle period of either the first or second characterized idle states transitions to a power consumption that is lower than a respective aggregate power consumption of the second or first, respectively, characterized idle state.

4. The device of claim 3, wherein the calibration unit is arranged to store the determined threshold information in association with an indication of the idle state having the transitioned-to lower power consumption, wherein the indication of the idle state identifies the idle state having the transitioned-to lower power consumption as being the idle power state.

5. The device of claim 4, wherein the estimated idle period is compared with the stored threshold information to determine the associated idle state having the lower power consumption.

6. The device of claim 4, wherein the indication of the idle state identifies the idle state having the transitioned-to lower power consumption as being the idle power state.

7. The device of claim 6, wherein the idle power state is subsequently characterized in response to the identification of being the idle power state.

8. The device of claim 4, wherein estimation of idle time is determined in response to a comparison between performance requirements and performance capabilities of the computing device.

9. The device of claim 1, wherein the characterization is performed after the deployment of the computing device.

10. The device of claim 9, wherein the characterization is initiated within the computing device.

11. The device of claim 1, wherein the stored threshold information is updated to reflect newer threshold information derived from the processor power indications provided by the detector.

12. The device of claim 1, wherein the characterization is performed at periodic intervals.

13. The device of claim 1, wherein the characterization is performed in response to a change in operating temperature of the computing device.

14. The device of claim 1, wherein the idle period includes the quiescent idle period and one or more of the entry transition period and the exit transition period of the idle state.

15. A low power states characterization system, comprising:
- a processor coupled to a power supply, the processor including a plurality of idle power states, each idle power state associated with an idle period;
- a current detector that is arranged to perform power measurements of the processor and to report a total power consumption of the processor for each possible idle power state over a plurality of different durations for each possible idle power state; and
- a calibration unit that is arranged to communicate with the current detector and the processor, and to store the reported total power consumption data from the detector, and wherein the calibration unit activates a calibration sequence to select an idle power state of the processor in response to comparisons of the received total power consumption data with the stored total power consumption data for each idle power state, repeating the calibration sequence for different idle periods over each idle power state, and selecting an idle power state for a given idle period in response to the total power consumption data reported by the current detector.

16. The system of claim 12, wherein the current detector is arranged in a common substrate the processor.

17. The system of claim 12 wherein the calibration unit is at least partially embodied as a software application of the processor.

18. A method, comprising:
- selecting an idle state from a group of characterized idle states in response to an estimated idle period in which a processor is estimated to remain in the selected idle state;
- providing processor power indications that are used to determine an amount of power consumed by the processor while the processor is in any of the idle states of the group of characterized idle states; and
- characterizing each idle state of the group of characterized idle states in response to the provided processor power indications, wherein each idle state is characterized by determining an aggregate amount of power consumed by the processor during each iteration of the processor operating in the idle state for a different idle period.

19. The method of claim 18, comprising updating a list of selected idle power states in response to a parsable list of possible idle power states that is received after deployment of a system that includes the processor.

20. The method of claim 18, wherein each idle state of the group of characterized idle states is characterized after deployment of a system that includes the processor.

* * * * *